United States Patent
Lucht et al.

(10) Patent No.: US 10,046,734 B2
(45) Date of Patent: Aug. 14, 2018

(54) FORCE-LIMITING DEVICE FOR A SAFETY BELT SYSTEM

(71) Applicant: Autoliv Development AB, Vårgårda (SE)

(72) Inventors: Andreas Lucht, Horst (DE); Meik Dannenberg, Bokel (DE); Patrick Süllau, Henstedt-Ulzburg (DE); Andra Elsner, Sommerland (DE); Lars Ricken, Tornesch (DE); Yashwanth Singh, Karnataka (IN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 134 days.

(21) Appl. No.: 15/029,805

(22) PCT Filed: Oct. 13, 2014

(86) PCT No.: PCT/EP2014/071873
§ 371 (c)(1),
(2) Date: Apr. 15, 2016

(87) PCT Pub. No.: WO2015/055573
PCT Pub. Date: Apr. 23, 2015

(65) Prior Publication Data
US 2016/0250994 A1 Sep. 1, 2016

(30) Foreign Application Priority Data

Oct. 16, 2013 (DE) .................. 10 2013 220 956

(51) Int. Cl.
*B60R 22/46* (2006.01)
(52) U.S. Cl.
CPC ........ *B60R 22/46* (2013.01); *B60R 2022/468* (2013.01); *B60R 2022/4685* (2013.01)

(58) Field of Classification Search
CPC .............. B60R 22/46; B60R 2022/468; B60R 2022/4685
See application file for complete search history.

(56) References Cited

U.S. PATENT DOCUMENTS

| 7,416,151 B2 * | 8/2008 | Mori | B60R 22/44 |
| | | | 242/390.8 |
| 7,934,673 B2 * | 5/2011 | Saito | B60R 22/44 |
| | | | 242/374 |

FOREIGN PATENT DOCUMENTS

| DE | 103 42 230 A1 | 5/2005 |
| DE | 10 2008 008 041 A1 | 7/2008 |

(Continued)

OTHER PUBLICATIONS

PCT International Search Report—dated Feb. 4, 2015.

*Primary Examiner* — Sang K Kim
(74) *Attorney, Agent, or Firm* — Brinks Gilson & Lione

(57) ABSTRACT

A reversible seat belt tensioner including a rotationally operable plastic driven gear (1), and a drive moved with a belt shaft of the belt tensioner. At least one coupling pawl (4) is provided on the drive gear, engaging a gearing of the drive gear upon activation of the reversible belt tensioner, and in a load-transmitting position produces a linkage between the driven gear (1) and the drive gear. A support ring (3) made of a material having a greater strength than the driven gear (1) is provided and is connected to the driven gear (1) for with a projection (21, 22) which into a recess (15, 16) of the driven gear (1). The recess (15, 16) positioned such that the coupling pawl (4) is braced against the driven gear (1) via the projection (21, 22) which engages in the recess (15, 16).

9 Claims, 5 Drawing Sheets

(56) References Cited

FOREIGN PATENT DOCUMENTS

EP          1 731 388          12/2006
WO     WO 2005/028265 A1     3/2005

* cited by examiner ature of a spring clip, which can be mounted in the recess in a simple manner by being laterally pushed in. Due to the further proposed mounting, the support ring can be mounted and secured in a particularly simple manner on the driven gear, by the support ring being first pushed axially with the pin over the driven gear, and then being rotated until the pin latches into the recess and engages therein.

FORCE-LIMITING DEVICE FOR A SAFETY BELT SYSTEM

CROSS REFERENCE TO RELATED APPLICATIONS

This application claims priority to German Patent Application No. 10 2013 220 956.8, filed Oct. 16, 2013 and PCT International Application No. PCT/EP2014/071873, filed on Oct. 13, 2014.

FIELD OF THE INVENTION

The invention relates to a gearbox for a reversible seat belt tensioner for a motor vehicle.

BACKGROUND

A reversible seat belt tensioner including a gearbox of the above-mentioned type is known from DE 103 42 230 A1. The gearbox includes, inter alia, a rotary element in the form of an externally-toothed gear, which upon activation of the reversible belt tensioner, is rotationally driven by a worm gear drivable by an electric motor. The rotational motion of the rotary element is transmitted via opposing coupling pawls to a belt shaft of the belt retractor upon which a seat belt is rolled in order to reduce the belt slack. The coupling pawls are each guided under tension into a guide on the rotary element. Furthermore, a friction ring is provided, which couples the two coupling pawls together and which in the event of a movement relative to the rotary element, forces the coupling pawls into a modulating movement. Due to this modulating of the coupling pawls, they are brought into engagement with a gearing of a drive gear, which drive gear is connected to the belt shaft for rotation therewith, so that the coupling pawls subsequently transfer the rotational movement of the driven gear via the drive gear to the belt shaft.

The driven gear is made of plastic, such as POM, for reasons of noise reduction, for weight reasons, and for cost reasons. With modern reversible belt tensioners, maximum tensile forces of 500-600 N can be generated in the upper end of the diagonal belt section abutting against the shoulder, which in this case are transmitted from the electric motor to the safety belt via the gearbox shaft, the externally-toothed driven gear, the coupling pawls, the drive gear, and the belt shaft. A part under particularly high load in the path of force transmission is the driven gear, which is highly loaded, especially in the region of the supporting of the coupling pawls and is thus subject to an increased probability of failure.

The object of the present invention is thus to provide a gearbox for a reversible seat belt tensioner of the above-mentioned type, wherein the probability of failure of the driven gear due to an excessive component loading of the driven gear is reduced.

To achieve this object a gearbox is proposed having the features described herein by the Figures, and the associated description.

SUMMARY AND INTRODUCTORY DESCRIPTION

According to the basic feature of the present invention, it is proposed that a support ring connected to the driven gear for conjoint rotation therewith and made of a material having a greater strength than the driven gear is provided, which protrudes with a projection into a first recess of the driven gear, wherein the recess is positioned such that the at least one coupling pawl in the load-transmitting position is supported on the driven gear via the projection of the support ring which engages in the recess. Due to the projection of the support ring engaging in the recess, a more solid support surface for the at least one coupling pawl is deliberately created, so that the coupling pawl is better supported in the load-transfer position. Due to the improved supporting of the coupling pawl, the probability of a lateral slippage of the coupling pawl and of a resultant interruption in force transfer can be reduced. The forces to be transferred can be introduced into the driven gear, in particular from a smaller contact surface of the projection on which the coupling pawl abuts, via a larger supporting surface by which the projection or the support ring abuts on the driven gear, whereby the maximum local component stresses in the driven gear and thus the probability of damage to the driven gear can be additionally reduced. The support ring here is deliberately made of a higher-strength material, so that it can absorb greater loads without itself being deformed. The support ring serves in practice to moderate the forces introduced into the driven gear when the coupling pawl is under load, and to reduce the local component stresses generated thereby.

Furthermore, it is proposed that a guide including a guide surface is provided on the driven gear, against which guide the coupling pawl abuts when in the load-transmitting position, and the first recess is arranged adjacent to the guide surface, and the projection is shaped such that it extends or supplements the guide surface in a homogeneous profile. Using the proposed solution, the guide surface itself, or an extension thereof is locally reinforced by the projection engaging in the recess, whereas the shape of the guide surface is otherwise not changed, so that the extension movement of the coupling pawls and the coupling process is identical to the proven coupling process known in the prior art.

Since the stress on the driven gear when under load is greatest in the radial outer section of the guide surface, it is particularly expedient when the first recess having the projection engaging therein is disposed in the region of a radial outer section of the guide surface. Therefore, the load is greatest in the radial outer section of the guide surface because this radially outer section is closest to or is located opposite the engagement section of the coupling pawls into the gearing of the drive gear, so that the load of the driven gear is greatest in this region. Thus, a reinforcement of the guide surface in this section or in the extension of the guide surface is especially useful.

It is additionally proposed that the guide is formed by an open groove in the driven gear into which open groove the coupling pawl is inserted, and the support ring covers the guide with the inserted coupling pawl on the open side. The support ring thus secures the coupling pawls additionally against a lateral slippage out from the guide. Thus the support ring serves in an additional function for lateral securing of the coupling pawls, so that in addition the probability of failure of the gearbox due to disengaging of the coupling pawls can be reduced.

Furthermore, the support ring can be axially secured to the driven gear via a latching connection. Due to the proposed axial connection, the support ring including the projection can be held on the driven gear in a particularly simple and assembly-friendly manner by pushing-on and latching.

It is additionally proposed that the support ring is secured from rotating with respect to the driven gear via at least one pin engaging in a recess of the driven gear. The pin forms a torque support, which prevents the support ring from being urged out of its intended position due to occurring centrifugal forces.

In particular, the support ring can be produced in a cost-effective manner as a punched metal part or as a plastic part having a greater strength than the driven gear, wherein the punched metal part has the advantage of a particularly great strength with a simple deformability, and the plastic part has the advantage of very cost-effective manufacture using an injection molding method.

BRIEF DESCRIPTION OF THE DRAWINGS

The invention will be explained in greater detail below based on a preferred embodiment and with reference to the accompanying Figures.

DETAILED DESCRIPTION

Figure 1:
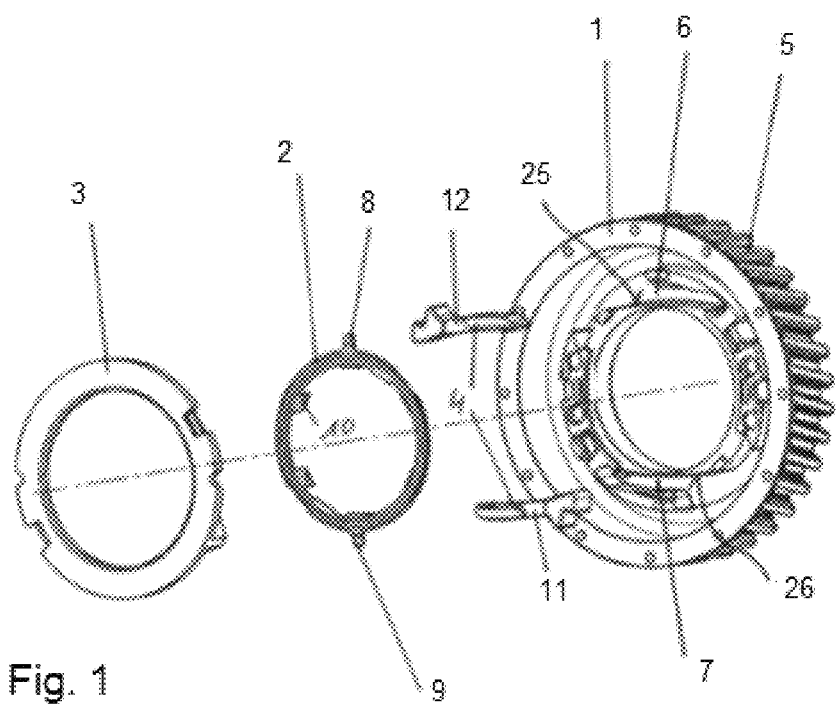
FIG. 1 shows a driven gear with two coupling pawls and one support ring in exploded view.

In FIG. 1 a driven gear 1 of a gearbox according to the invention including a reversible belt tensioner, is shown, as is known in its fundamental form, e.g., from DE 103 42 230 A1. The operation of the reversible seat belt tensioner is additionally known from WO 03/099619 A2. With respect to an understanding of the operation of the reversible belt tensioner and of the associated gearbox, these publications are incorporated by reference in the disclosure content of this application.

Figure 8:
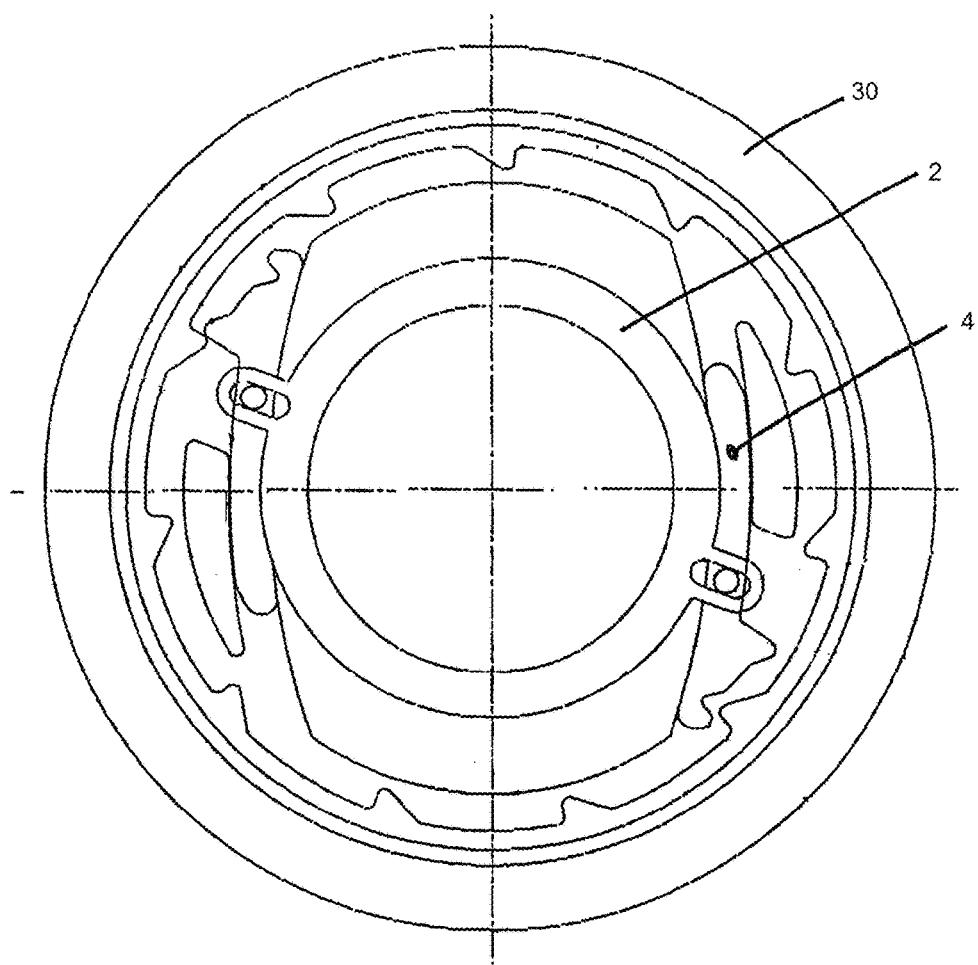
FIG. 8 shows a portion of a reversible seatbelt retractor in accordance with the prior art.

In addition to the driven gear 1, a friction ring 2, a support ring 3 and two coupling pawls 4 can also be seen. The coupling pawls 4 are inserted in open guides 6 and 7 of the driven gear 1, subsequently the friction ring 2 is placed and the composite is axially secured by placement of the support ring 3. The coupling pawls 4 each include a recess 11 and 12 into which the friction ring 2 engages via a tab 8 and 9. The friction ring 2 is additionally held in a known, friction-fit manner by radially inwardly protruding friction arms 10 against a part connected to the driven gear 1 such that the part can freely rotate with respect to the driven gear 1, so that during a rotational operating of the driven gear 1, the friction ring 2 lags behind with respect to the driven gear 1, and during the rotational movement of the driven gear 1, the coupling pawls 4 are held back with respect to the driven gear 1 by the engagement of the tabs 8 and 9 in the recesses 11 and 12. Due to the retention of the coupling pawls 4, the coupling pawls 4 travel radially outward automatically from the guides 6 and 7 during the rotational movement of the driven gear 1, and simultaneously engage in a gearing of a drive gear 30 shown in FIG. 8 and described in the publications referenced above, whereby the belt shaft of the reversible belt tensioner is driven in the wind-up direction. FIG. 8 further identifies components which are analogues to components described in the described embodiment of the present invention including friction ring 2' and pawls 4'. To this extent, the gearbox corresponds in operation to the prior art except for the provided support ring 3.

Figure 2:
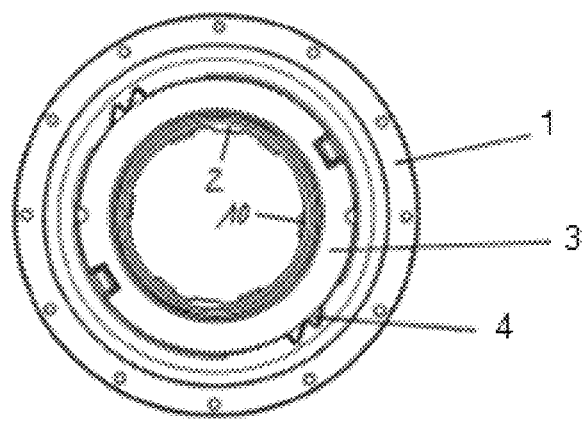
FIG. 2 shows a driven gear with support ring set thereon.
Figure 3:
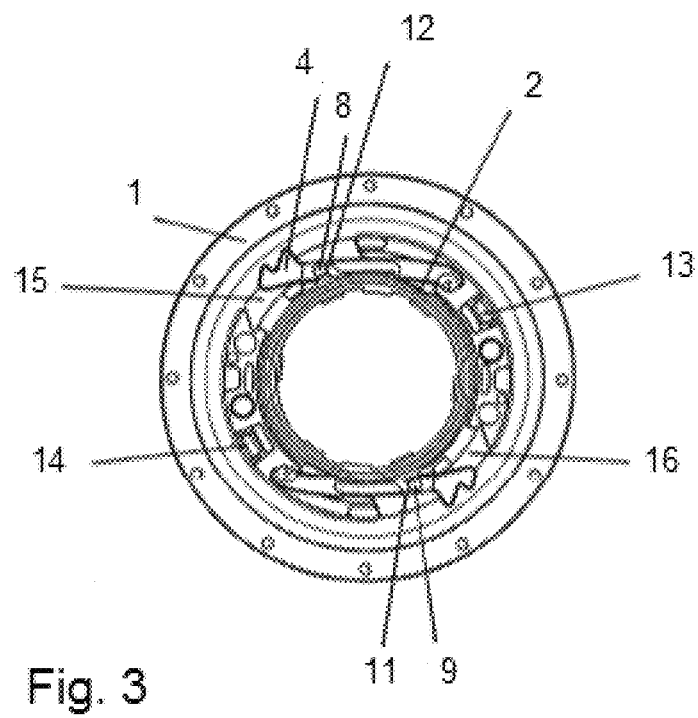
FIG. 3 shows a driven gear without support ring.
Figure 6:
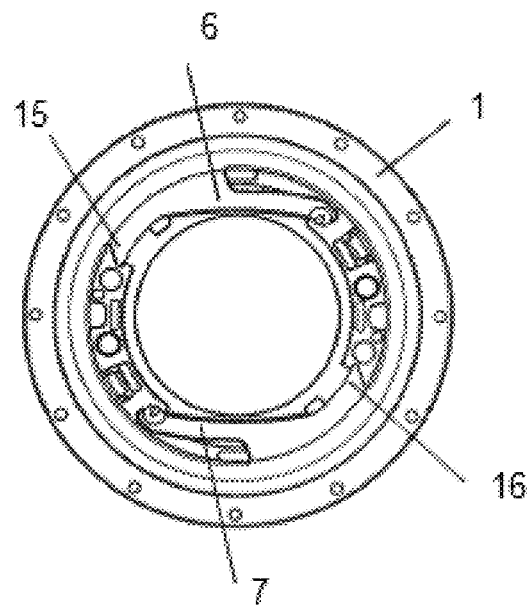
FIG. 6 shows a driven gear in a first view.
Figure 7:
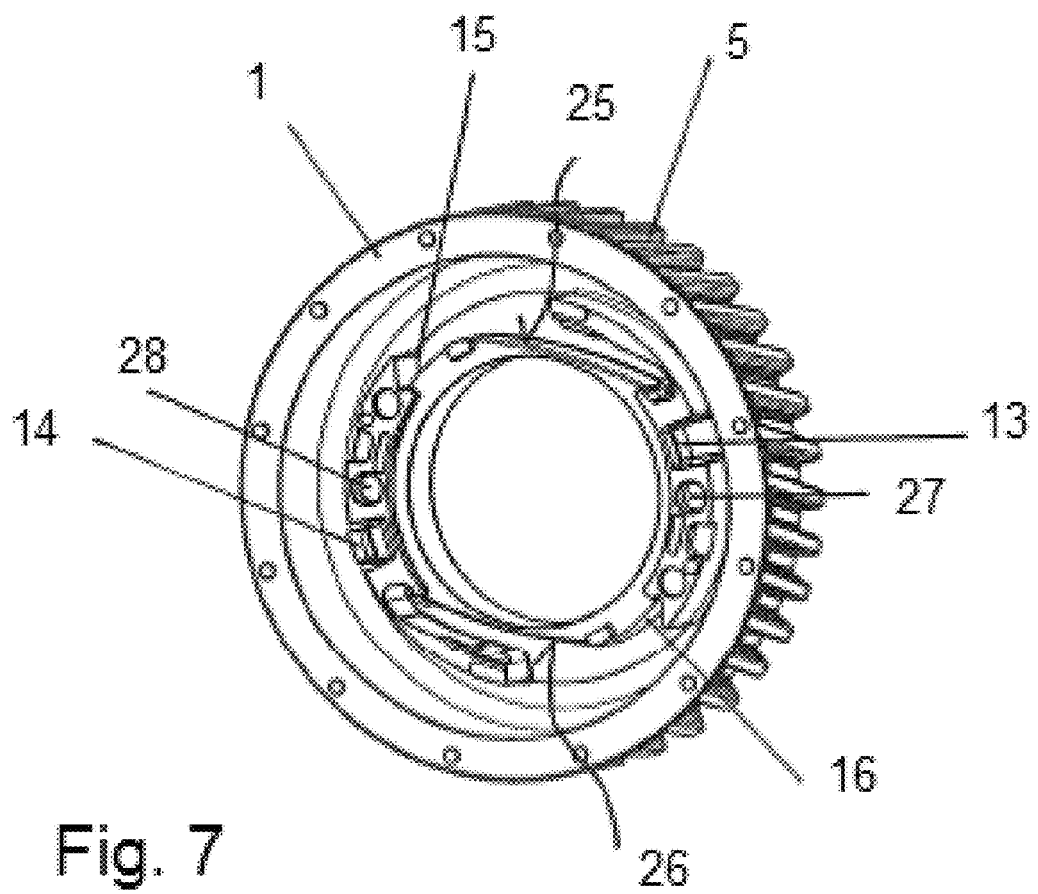
FIG. 7 shows a driven gear in a second view.

In FIG. 2 and FIG. 3, the driven gear 1 including inserted coupling pawls 4 can be seen with and without support ring 3, whereas the driven gear 1 can be seen in FIG. 6 and FIG. 7 in different views without the coupling pawls 4. The coupling pawls 4 in the open guides 6 and 7 abut against radially inner guide surfaces 25 and 26, which control the direction and the course of the above-described extension movement of the coupling pawls 4. There is a first recess 15 and 16 provided on each of the guide surfaces 25 and 26 in the radial outer section, that is, adjacent to the extension openings of the guides 6 and 7. Furthermore, two latching hooks 13 and 14 protruding toward the viewer on the driven gear 1 and two additional, circular recesses 27 and 28 are provided.

Figure 4:
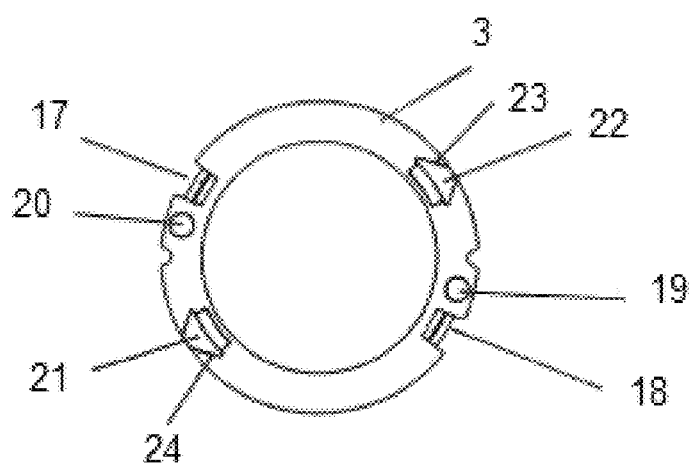
FIG. 4 shows a support ring in a first view.
Figure 5:
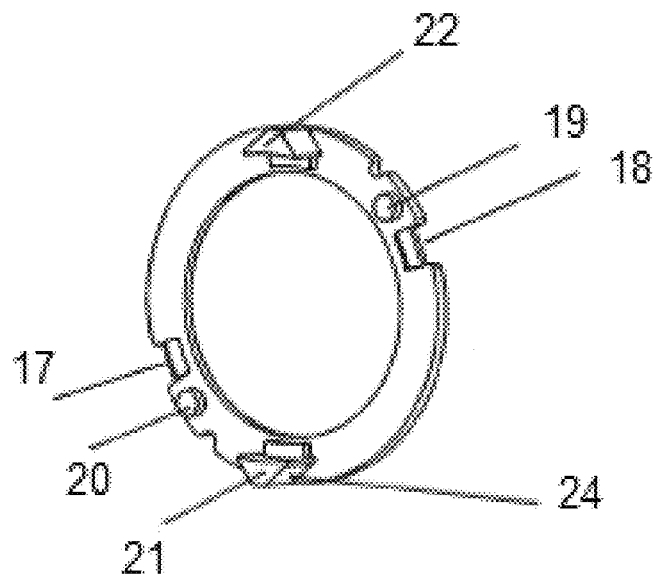
FIG. 5 shows a support ring in a second view.

The support ring 3 is shown in different views in FIG. 4 and FIG. 5. The support ring 3 includes two diametrically opposing projections 21 and 22, projecting on one side in the axial direction and having a trapezoidal cross-section; in the cross-section the protrusions taper radially outward in width. Furthermore, diametrically opposing, axially protruding pins 19 and 20 are provided on the support ring 3, and two diametrically positioned recesses 17 and 18 are provided on the radially outer side. After insertion of the coupling pawls 4 into the guides 6 and 7, and placing of the friction ring 2, the support ring 3 is placed and specifically in such an alignment that the support ring 3 engages via the projections 21 and 22 into the first recesses 15 and 16 and via the pins 19 and 20 engages into the second recesses 27 and 28. At the same time, the latching hooks 13 and 14 engage in the recesses 17 and 18 of the support ring 3 and latch behind the edge of the support ring 3, so that the support ring 3 is then secured in the axial direction against the driven gear 1. Furthermore, the support ring 3 is secured by the pins 19 and 20 engaging in the second recesses 27 and 28 and by the latching hooks 13 and 14 engaging in the sections 17 and 18 to prevent any twisting with respect to the driven gear 1. The projections 21 and 22 are shaped such that they engage into the first recesses 15 and 16 and entirely fill the recesses 15 and 16. Each of the projections 21 and 22 includes a lateral flank 23 and 24, which is shaped and positioned such that in the installed position of the support ring 3 it adjoins the guide surfaces 25 and 26 and the guide surfaces 25 and 26 supplement or extend in a homogeneous, level, i.e. continuous profile.

The support ring 3 is made of a material such as metal or a hard plastic, for example, which has a greater strength than the material of the driven gear 1. Furthermore, the flanks 23 and 24 against which the coupling pawls 4 abut when under load, that is, in the extended position, have a smaller surface area than the surface via which the projections 21 and 22 abut against the driven gear 1 in the region of the remaining circumferential surface. Due to the proposed design of the support ring 3 having a greater strength than the driven gear 1, the abutment surface of the flanks 23 and 24 formed by the projections 21 and 22 for the coupling pawls will be deformed at least to a lesser extent, so that the coupling pawls 4 are better supported when under load. In addition, the reactive force from the stronger projections 21 and 22 is transmitted over a greater abutment surface to the driven gear 1, so that the local maximum component stresses in the driven gear 1 are reduced in the region of the abutment of the projections 21 and 22. Furthermore, the coupling pawls 4 with friction ring 2 are additionally axially secured by the support ring 3 held in place by the latching hooks 13 and 14. It is of particular advantage here that the support ring 3 covers the side of the open guides 6 and 7 with coupling pawls 4 disposed therein, so that the coupling pawls 4 cannot slip out to the side from the guides 6 and 7, especially when under load.

The first recesses 15 and 16 are disposed in a radially outer section of the guide surfaces 25 and 26, or adjacent to the radial outer extension openings of the guides 6 and 7. Thus the guides 6 and 7 are reinforced precisely in the region which is under the greatest load via the coupling pawls 4. This is because the coupling pawls 4, upon extension, engage with the teeth in the radially outer gearing of the driven gear and during the transmission of the rotary movement are placed under load in the circumferential direction, and thus are pressed against the rigid-shape flanks 23 and 24 of the projections 21 and 22 with a particularly large pressure force. The concept of strength within the meaning of the invention means in particular a greater deformation rigidity and a greater hardness. In this respect the support ring 3 can be formed, for example, as a shaped metal part or from a hard plastic. In the present exemplary embodiment, the support ring 3 is formed from POM or zamak, whereby it can be produced at low cost and satisfies the strength requirements placed upon it.

While the above description constitutes the preferred embodiment of the present invention, it will be appreciated that the invention is susceptible to modification, variation and change without departing from the proper scope and fair meaning of the accompanying claims.

The invention claimed is:

1. A gearbox for a reversible seat belt tensioner having a drive gear with radially inward extending gearing connected or connectable to a belt shaft of the belt tensioner for rotation with the belt shaft comprising:
   a rotationally operable driven gear made of a plastic,
   a friction ring engaged with the drive gear and having at least one tab,
   at least one coupling pawl provided on the driven gear, the coupling pawl having at least one first recess engaging with the at least one tab, the coupling pawl expanding in a radially outward direction to engage with the drive gear gearing upon activation of the reversible seat belt tensioner in a load-transmitting position and produces a linkage between the driven gear and the drive gear in at least one rotary direction of the driven gear such that the driven gear and the drive gear rotate together,
   a support ring made of a material having a greater strength than the driven gear is provided on the driven gear and is connected to the driven gear for rotation therewith, and including a projection which extends into a second recess of the driven gear, wherein
   the second recess is positioned such that the at least one coupling pawl in the load-transmitting position is braced against the driven gear via the projection of the support ring which engages in the second recess.

2. The gearbox according to claim 1, further comprising;
   a guide including a guide surface is provided on the driven gear against which the coupling pawl abuts when in the load-transmitting position,
   the second recess is disposed adjacent to the guide surface, and
   the projection is shaped such that it extends or supplements the guide surface in a homogeneous profile.

3. The gearbox according to claim 2, further comprising;
   the second recess with the protrusion engaging therein is disposed in the region of a radially outer section of the guide surface.

4. The gearbox according to claim 2, further comprising;
   the guide is formed by an open groove in the driven gear into which the coupling pawl is inserted, and
   the support ring covers the guide with the installed coupling pawl on an open side.

5. The gearbox according to claim 1, further comprising;
   the support ring is secured axially to the driven gear by a latching connection.

6. The gearbox according to claim 1, further comprising;
   the support ring is rotationally locked with respect to the driven gear by at least one pin engaging in the second recess of the driven gear.

7. The gearbox according to claim 1, further comprising:
   the support ring is formed by a punched metal part or by a plastic part having a greater strength than the driven gear.

8. The gearbox according to claim 1, wherein the at least one coupling pawl is further movable to a non-load-transmitting position in which the pawl does not produce a linkage between the driven gear and the drive gear.

9. The gearbox according to claim 1, wherein the material having a greater strength has at least one of a greater deformation rigidity and a greater hardness.

* * * * *